US012119910B2

(12) United States Patent
Chen et al.

(10) Patent No.: US 12,119,910 B2
(45) Date of Patent: Oct. 15, 2024

(54) COMMUNICATION METHOD, COMMUNICATION DEVICE, AND STORAGE MEDIUM

(71) Applicant: RUIJIE NETWORKS CO., LTD., Fujian (CN)

(72) Inventors: Jianxiang Chen, Fujian (CN); Lei Zheng, Fujian (CN)

(73) Assignee: RUIJIE NETWORKS CO., LTD., Fujian (CN)

( * ) Notice: Subject to any disclaimer, the term of this patent is extended or adjusted under 35 U.S.C. 154(b) by 0 days.

(21) Appl. No.: 18/650,131

(22) Filed: Apr. 30, 2024

(65) Prior Publication Data

US 2024/0291538 A1 Aug. 29, 2024

Related U.S. Application Data

(63) Continuation of application No. PCT/CN2023/129310, filed on Nov. 2, 2023.

(30) Foreign Application Priority Data

Nov. 2, 2022 (CN) .......................... 202211382256.4

(51) Int. Cl.
 *H04B 7/06* (2006.01)
(52) U.S. Cl.
 CPC .......... *H04B 7/0626* (2013.01); *H04B 7/063* (2013.01); *H04B 7/0641* (2013.01)
(58) Field of Classification Search
 None
 See application file for complete search history.

(56) References Cited

U.S. PATENT DOCUMENTS

| 10,158,259 B1* | 12/2018 | Leabman ................ H02J 50/80 |
| 2015/0077292 A1* | 3/2015 | Kalistaja ................ H01Q 5/371 |
| | | 29/601 |

(Continued)

FOREIGN PATENT DOCUMENTS

| CN | 103391602 | 4/2017 |
| CN | 110857973 | 3/2020 |

(Continued)

OTHER PUBLICATIONS

"International Search Report (Form PCT/ISA/210) of PCT/CN2023/129310," mailed on Jan. 17, 2024, with English translation thereof, pp. 1-6.

(Continued)

*Primary Examiner* — Kenny S Lin
(74) *Attorney, Agent, or Firm* — JCIPRNET

(57) ABSTRACT

Embodiments of this application provide a communication method, a communication device, a storage medium, and an electronic device. The method is applied to a first device. The first device is provided with a first antenna, a second antenna, and a third antenna. The method includes: receiving, at a first moment, first data from a second device through the first antenna and second data from the second device through the second antenna, where a distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold.

17 Claims, 4 Drawing Sheets

(56) References Cited

U.S. PATENT DOCUMENTS

| | | | | |
|---|---|---|---|---|
| 2017/0085120 A1* | 3/2017 | Leabman | ............... | H02J 50/60 |
| 2021/0351825 A1* | 11/2021 | Zhang | ............... | H04L 5/0094 |
| 2021/0405182 A1* | 12/2021 | Reynolds | ............... | G01S 13/887 |
| 2023/0152440 A1* | 5/2023 | Choi | ............... | H01Q 21/30 |
| | | | | 342/125 |
| 2023/0327734 A1* | 10/2023 | Talvitie | ............... | H04B 7/0617 |
| | | | | 370/329 |
| 2024/0088566 A1* | 3/2024 | Somersalo | ............... | H01Q 1/50 |
| 2024/0129726 A1* | 4/2024 | Russell | ............... | H04W 12/63 |

FOREIGN PATENT DOCUMENTS

| | | |
|---|---|---|
| CN | 111988740 | 5/2022 |
| CN | 113258965 | 6/2022 |
| CN | 115022803 | 9/2022 |
| CN | 115267652 | 11/2022 |
| CN | 114339991 | 2/2024 |

OTHER PUBLICATIONS

"Written Opinion of the International Searching Authority (Form PCT/ISA/237) of PCT/CN2023/129310," mailed on Jan. 17, 2024, with English translation thereof, pp. 1-6.

* cited by examiner

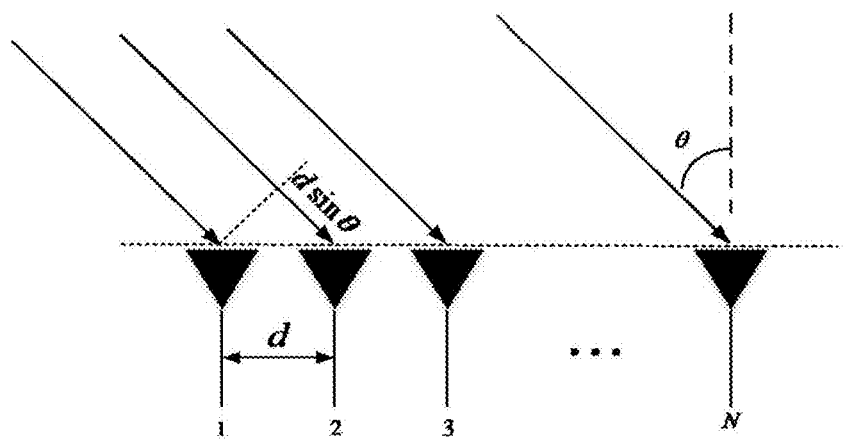
FIG. 1
Receive, at a first moment, first data sent by a second device through a first antenna and second data sent by the second device through a second antenna ⎯ S201
FIG. 2
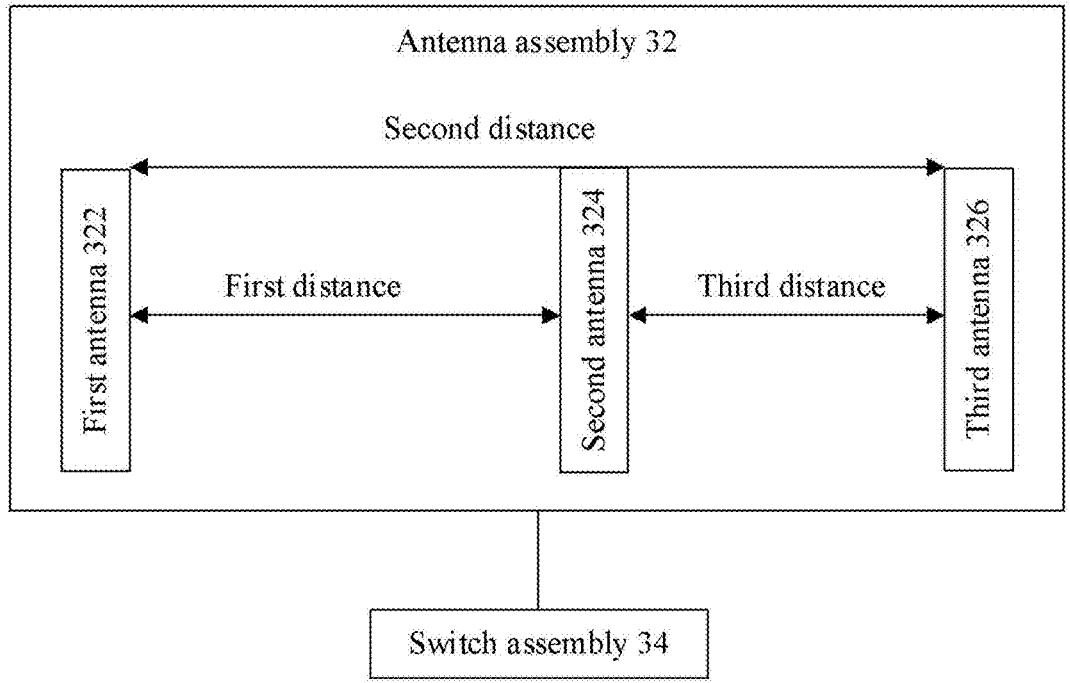
FIG. 3

COMMUNICATION METHOD, COMMUNICATION DEVICE, AND STORAGE MEDIUM

CROSS-REFERENCE TO RELATED APPLICATIONS

This application is a continuation of International Patent Application No. PCT/CN2023/129310 filed on Nov. 2, 2023, which claims priority to Chinese Patent Application No. 202211382256.4, filed with the China National Intellectual Property Administration on Nov. 2, 2022 and entitled "COMMUNICATION METHOD, COMMUNICATION APPARATUS, STORAGE MEDIUM, AND ELECTRONIC APPARATUS", both of which are incorporated herein by reference in their entireties.

TECHNICAL FIELD

This application relates to the communications field, and in particular, to a communication method, a communication device, a storage medium, and an electronic device thereof.

BACKGROUND

During positioning of a device, angle information of the device may be obtained based on an angle-of-arrival (Angle-of-Arrival, AoA) ranging and positioning method first, and then distance information of the to-be-positioned device is further obtained with reference to received signal strength indicator (Received Signal Strength Indicator, RSSI) data or time-of-arrival data. In this way, positioning of the device is implemented.

SUMMARY

According to a first aspect, a communication method is provided and applied to a first device. The first device includes a first antenna, a second antenna, and a third antenna. The method includes: receiving, at a first moment, first data from a second device through the first antenna and second data from the second device through the second antenna, where a distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold.

In a possible implementation, the method further includes: receiving, at a second moment, third data from the second device through the first antenna and fourth data from the second device through the third antenna; obtaining first channel state information CSI based on the first data, obtaining second CSI based on the second data, obtaining third CSI based on the third data, and obtaining fourth CSI based on the fourth data; and obtaining angle-of-incidence information of the second device relative to the first device based on the first CSI, the second CSI, the third CSI, and the fourth CSI.

In another possible implementation, the obtaining the angle-of-incidence information of the second device relative to the first device based on the first CSI, the second CSI, the third CSI, and the fourth CSI includes: obtaining a first deviation between the first CSI and the third CSI, and calibrating the fourth CSI based on the first deviation to obtain a first calibration value of the fourth CSI; and obtaining the angle-of-incidence information of the second device relative to the first device based on the second CSI and the first calibration value.

In another possible implementation, the first device is further provided with a fourth antenna, and the method further includes: receiving, at a third moment, fifth data from the second device through the third antenna and sixth data from the second device through the fourth antenna; and obtaining fifth CSI based on the fifth data, and obtaining sixth CSI based on the sixth data, where a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

In another possible implementation, the obtaining the angle-of-incidence information of the second device relative to the first device based on the first CSI, the second CSI, the third CSI, and the fourth CSI includes: obtaining a first deviation between the first CSI and the third CSI, and calibrating the fourth CSI based on the first deviation to obtain a first calibration value of the fourth CSI; obtaining a second deviation between the fourth CSI and the fifth CSI, and calibrating the sixth CSI based on the first deviation and the second deviation to obtain a second calibration value of the sixth CSI; and obtaining the angle-of-incidence information of the second device relative to the first device based on the first CSI, the second CSI, the first calibration value, and the second calibration value.

In another possible implementation, the first threshold is a half wavelength of an incident electromagnetic wave; or the second threshold is a half wavelength of an incident electromagnetic wave.

According to a second aspect, a communication device is provided and applied to a first device. The communication device includes an antenna assembly and a switch assembly, where the antenna assembly is configured to communicate with a second device, and the antenna assembly includes a first antenna, a second antenna, and a third antenna; and the switch assembly is configured to control the antenna assembly to receive, at a first moment, first data from the second device through the first antenna and second data from the second device through the second antenna, where a distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold.

In another possible implementation, the switch assembly is further configured to control the antenna assembly to receive, at a second moment, third data from the second device through the first antenna and fourth data from the second device through the third antenna; and the apparatus further includes a CPU, where the CPU is configured to obtain first channel state information CSI based on the first data, obtain second CSI based on the second data, obtain third CSI based on the third data, and obtain fourth CSI based on the fourth data; and obtain angle-of-incidence information of the second device relative to the first device based on the first CSI, the second CSI, the third CSI, and the fourth CSI.

In another possible implementation, the CPU is further configured to: obtain a first deviation between the first CSI and the third CSI, and calibrate the fourth CSI based on the first deviation to obtain a first calibration value of the fourth CSI; and obtain the angle-of-incidence information of the second device relative to the first device based on the second CSI and the first calibration value.

In another possible implementation, the antenna assembly further includes a fourth antenna; the switch assembly is further configured to control the antenna assembly to receive, at a third moment, fifth data from the second device through the third antenna and sixth data from the second device through the fourth antenna; and the CPU is further configured to obtain fifth CSI based on the fifth data, and obtain sixth CSI based on the sixth data; and obtain the angle-of-incidence information of the second device relative to the first device based on the first CSI, the second CSI, the third CSI, the fourth CSI, the fifth CSI, and the sixth CSI, where a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

In another possible implementation, the CPU is further configured to: obtain a first deviation between the first CSI and the third CSI, and calibrate the fourth CSI based on the first deviation to obtain a first calibration value of the fourth CSI; obtain a second deviation between the fourth CSI and the fifth CSI, and calibrate the sixth CSI based on the first deviation and the second deviation to obtain a second calibration value of the sixth CSI; and obtain the angle-of-incidence information of the second device relative to the first device based on the first CSI, the second CSI, the first calibration value, and the second calibration value.

In another possible implementation, the first threshold is a half wavelength of an incident electromagnetic wave; or the second threshold is a half wavelength of an incident electromagnetic wave.

In another possible implementation, the communication device further includes a radio frequency assembly, where the switch assembly includes one or more switches, one end of the switch is connected to a plurality of antennas, and the other end of the switch is connected to the radio frequency assembly.

In another possible implementation, the antenna assembly, the switch assembly, and the radio frequency assembly are integrated on a PCB board.

In another possible implementation, the switch assembly includes a first switch and a second switch, and the radio frequency assembly includes a first radio frequency subassembly and a second radio frequency subassembly; the first switch and the first radio frequency subassembly cooperate to control the first antenna and the fourth antenna; and the second switch and the second radio frequency subassembly cooperate to control the second antenna and the third antenna.

In another possible implementation, both the first switch and the second switch are double-pole double-throw switches.

In another possible implementation, the antennas in the antenna assembly are arranged in a planar array or a three-dimensional array.

In another possible implementation, at least one antenna in the antenna assembly is disposed outside the PCB board.

According to a third aspect, a storage medium is provided, where the storage medium stores computer-executable instructions, and the computer-executable instructions are used to enable a computer to perform the steps included in any method in the first aspect.

According to a fourth aspect, an electronic device is provided and includes a memory and a processor, where the memory stores a computer program, and the processor is configured to run the computer program to perform the steps included in any method in the first aspect.

The technical solution provided by this application can take into account a requirement for measuring an angle of arrival AoA while ensuring basic transmission performance of a device.

Other features and advantages of this application will be set forth later in the specification, and will be readily apparent from the specification in part, or may be understood by implementing embodiments of this application. Objectives and other advantages of this application may be achieved and obtained by using a structure particularly stated in the written specification, claims, and accompanying drawings.

It should be understood that the foregoing general descriptions and the following detailed descriptions are merely illustrative and explanative, and do not constitute any limitation on this application.

BRIEF DESCRIPTION OF DRAWINGS

To describe the technical solutions of this application more clearly, the following briefly describes the accompanying drawings required for describing the embodiments of this application. Apparently, the accompanying drawings in the following description show merely some embodiments of this application, and a person of ordinary skill in the art may still derive other drawings of the embodiments from the accompanying drawings without creative efforts. In this application, FIG. 1 is a schematic diagram of an AoA antenna array in the related art;

FIG. 2 is a flowchart of a communication method according to an embodiment of this application;

FIG. 3 is a schematic diagram of a communication device according to an embodiment of this application;

DESCRIPTION OF EMBODIMENTS

Figure 4:
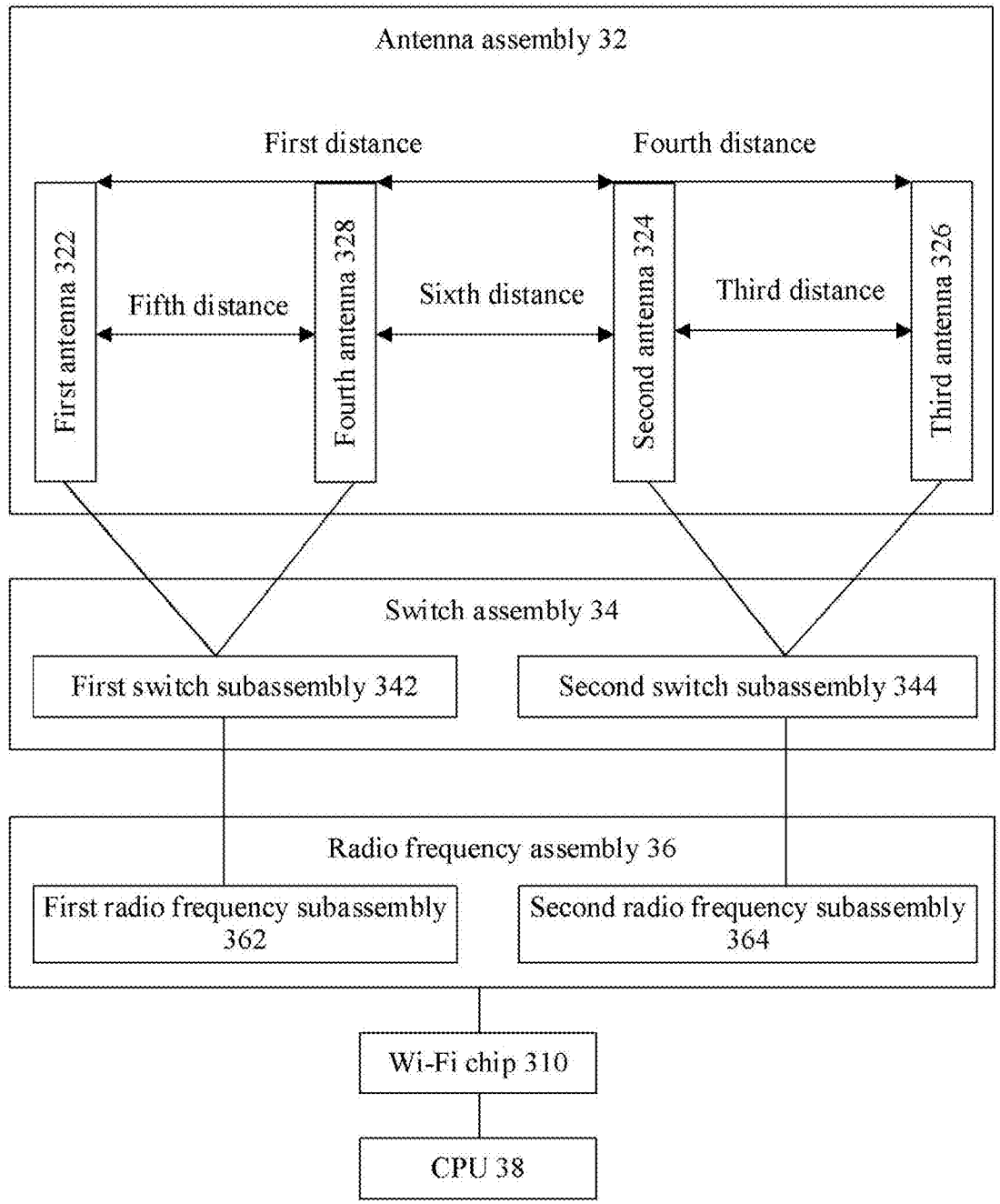
FIG. 4 is a schematic diagram of another communication device according to an embodiment of this application.

To make the objectives, technical solutions, and advantages of this application clearer, the following clearly and thoroughly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on embodiments of this application without creative efforts shall fall within the protection scope of this application. In absence of conflicts, the embodiments of this application and features in the embodiments may be combined arbitrarily. Moreover, although a logical order is shown in the flowchart, in some cases, the steps shown or described may be performed in an order different from this order.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, product, or device.

In a case that the terms "comprise", "have", and "include" described in this application are used, another component may also be added unless a definite restrictive term such as "only", or "consist of" is used. Unless otherwise mentioned, a term in a singular form is intended to cover a plural form, and a quantity thereof cannot be interpreted as only one.

FIG. 1 is a schematic diagram of a common AoA antenna array. As shown in FIG. 1, N antennas are arranged at a specific interval, where the interval is d. Each antenna receives an incident electromagnetic wave, and then transmits the incident electromagnetic wave to a back-end processing module. The back-end processing module obtains channel state information (Channel State Information, CSI), and then obtains incident electromagnetic wave angle information θ° of the antenna through calculation by using an algorithm such as multiple signal classification (Multiple Signal Classification, MUSIC), conventional beamforming (Conventional Beamforming, CBF), and estimating signal parameter via rotational invariance techniques (estimating signal parameter via rotational invariance techniques, ESPRIT) in combination with CSI data of a plurality of antennas.

AoA positioning is implemented usually with sacrificing communication performance between devices. Specifically, in design, a distance between antennas is shortened to preferentially ensure that an antenna array meets requirements of the AoA array. This leads to increase of spatial correlation between antennas and increase of interference, causing degradation of data transmission performance between devices and weakening of a communication performance.

In view of this, this application provides a communication method. By using this method, a first device selects only a group of antennas with a distance between the antennas being greater than a first threshold, for communication, to ensure that a distance between communicating antennas is long enough and that spatial correlation is low enough, thereby further ensuring a good communication performance between devices. In addition, the first device is further provided with a third antenna, and a distance between the third antenna and a second antenna is less than a second threshold. Therefore, it can be ensured that when AoA measurement is performed subsequently, a distance between antennas used for the AoA measurement is short enough, and that an angle of arrival AoA can be better calculated. By using the foregoing method, in a case that an angle of arrival AoA of a peer device needs to be measured, an angle-of-arrival measurement effect can also be taken into account while basic transmission performance between devices is ensured.

An embodiment of this application provides a communication method, applied to a first device, where the first device is provided with a first antenna, a second antenna, and a third antenna. FIG. 2 is a flowchart of the communication method according to an embodiment of this application. As shown in FIG. 2, the method includes the following step.

S201. Receive, at a first moment, first data sent by a second device through the first antenna and second data sent by the second device through the second antenna.

A distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold.

The first device may be a wireless access point (Access Point, AP) or another data communication device. The second device may be a user terminal or another data communication device.

By using the foregoing method, when performing communication, the first device does not use all antennas to perform data transmission simultaneously, but selects a group of antennas in which every two antennas, such as the first antenna and the second antenna, have a distance greater than the first threshold for communication. Generally, to meet a requirement on spatial correlation between antennas, that is, a distance should be as long as possible, the distance between antennas in the group of antennas is usually set to be greater than a half wavelength of an incident electromagnetic wave, that is, ½ wavelength. The first threshold may be further set to a half wavelength. Using the combination of antennas with low spatial correlation to perform communication can ensure a good communication performance.

It should be noted that data communication is not limited to communication using merely the two antennas of the first antenna and the second antenna. More antennas may be used to perform communication with the second device at a same moment, as long as every two antennas meet a requirement of the first threshold.

In addition, the first device is further provided with the third antenna. The distance between the third antenna and the second antenna is less than the second threshold. Therefore, it can be ensured that when AoA measurement is performed subsequently, a distance between antennas used for the AoA measurement is short enough, and that an angle of arrival AoA can be better calculated. Generally, to meet a requirement for measuring an array antenna, the distance between the third antenna and the second antenna is usually set to be less than a half wavelength. The second threshold may be further set to a half wavelength. Further, the first threshold is greater than or equal to the second threshold.

Likewise, the AoA measurement is not limited to measurement merely using the two antennas of the second antenna and the third antenna. More antennas may be used to perform the measurement, as long as every two antennas meet a requirement of the second threshold.

In addition, it should be noted that the distance between every two antennas does not need to be completely the same as one another, as long as the requirement of the first threshold and the requirement of the second threshold can be met. The first threshold and the second threshold may be the same or different. The setting of the first threshold and the second threshold is not limited only to a half wavelength. The first threshold and the second threshold may also be adjusted to other lengths based a service requirement, for example, may be set to ¼ wavelength, ¾ wavelength, or the like.

In addition, because the distance between the first antenna and the third antenna is greater than the first threshold, the first antenna and the third antenna may also be used as a combination for communication transmission.

In a possible implementation, after the receiving, at the first moment, the first data from the second device through the first antenna and the second data from the second device through the second antenna, the method further includes: receiving, at a second moment, third data from the second device through the first antenna and fourth data from the second device through the third antenna; obtaining first channel state information CSI of the first antenna at the first moment based on the first data, obtaining second CSI of the second antenna at the first moment based on the second data, obtaining third CSI of the first antenna at the second moment based on the third data, and obtaining fourth CSI of the third antenna at the second moment based on the fourth data; and obtaining angle-of-incidence information of the second device relative to the first device based on the first CSI, the second CSI, the third CSI, and the fourth CSI.

By using the obtained CSI of each antenna, distances between the antennas, antenna radiation patterns, and a transmission delay of each antenna, AoA measurement may be implemented. When specific AoA measurement is performed, an angle of the second device relative to the first device can be estimated by using an algorithm such as MUSIC.

In addition, the antennas may be arranged in a linear array or a planar array. When the AoA is being calculated, the linear array is a better arrangement for calculating the AoA. However, the linear array has a problem that a resolution in an arrangement direction is low. Therefore, during antenna design, the linear array is usually not used, but the planar array or a three-dimensional array may be used.

In another possible implementation, the obtaining the angle-of-incidence information of the second device relative to the first device based on the first CSI, the second CSI, the third CSI, and the fourth CSI includes: obtaining a first deviation between the first CSI and the third CSI, and calibrating the fourth CSI based on the first deviation to obtain a first calibration value of the fourth CSI at the first moment; and obtaining the angle-of-incidence information of the second device relative to the first device based on the second CSI and the first calibration value.

To avoid impact on each piece of CSI from reference values at different moments, it is necessary to calibrate the CSI at the second moment and calibrate the related CSI to the first moment. Specifically, the following is assumed: The CSI of the first antenna at the first moment is CSI1-1, the CSI of the second antenna at the first moment is CSI2-1, the CSI of the first antenna at the second moment is CSI1-2, and the CSI of the third antenna at the second moment is CSI3-2. A subtraction operation is performed on CSI1-2 and CSI1-1 to obtain a first deviation value Delta1. A Delta1 is subtracted from CSI3-2 to obtain the CSI CSI3-1 of the third antenna at the first moment. Calibrated CSI3-1 is used with CSI2-1 to estimate the angle of the second device. For example, an algorithm such as MUSIC can be used to estimate the angle of the second device relative to the first device. In this scenario, the distance between the second antenna and the third antenna is less than the second threshold. Therefore, the angle of arrival AoA can be better calculated.

In another possible implementation, the first device is further provided with a fourth antenna, and after the receiving, at the second moment, the third data from the second device through the first antenna and the fourth data from the second device through the third antenna, the method further includes: receiving, at a third moment, fifth data from the second device through the third antenna and sixth data from the second device through the fourth antenna; and obtaining fifth CSI of the third antenna at the third moment based on the fifth data, and obtaining sixth CSI of the fourth antenna at the third moment based on the sixth data, where a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

Further, a 4-antenna structure is a relatively reliable basic condition for the AoA measurement, and the fourth antenna may also be disposed in the first device. In a 4-antenna scenario, because the distance between the first antenna and the second antenna and the distance between the third antenna and the fourth antenna are both greater than the first threshold, the antennas may also be used as two combinations for communication transmission. When AoA measurement needs to be performed on the second device, the first device sequentially uses three antenna combinations to perform communication with the second device to obtain six pieces of CSI, thereby implementing the angle-of-arrival AoA measurement more accurately.

In another possible implementation, the obtaining the angle-of-incidence information of the second device relative to the first device based on the first CSI, the second CSI, the third CSI, and the fourth CSI includes: obtaining a first deviation between the first CSI and the third CSI, and calibrating the fourth CSI based on the first deviation to obtain a first calibration value of the fourth CSI at the first moment; obtaining a second deviation between the fourth CSI and the fifth CSI, and calibrating the sixth CSI based on the first deviation and the second deviation to obtain a second calibration value of the sixth CSI at the first moment; and obtaining the angle-of-incidence information of the second device relative to the first device based on the first CSI, the second CSI, the first calibration value, and the second calibration value.

In the 4-antenna scenario, the CSI also needs to be calibrated. The CSI at the second moment and the CSI at the third moment are calibrated to the first moment. Therefore, AoA calibration can be implemented more accurately. Specifically, the following is assumed: The CSI of the first antenna at the first moment is CSI1-1, the CSI of the second antenna at the first moment is CSI2-1, the CSI of the first antenna at the second moment is CSI1-2, the CSI of the third antenna at the second moment is CSI3-2, the CSI of the third antenna at the third moment is CSI3-3, and the CSI of the fourth antenna at the third moment is CSI4-3. A subtraction operation is performed on CSI1-2 and CSI1-1 to obtain a first deviation value Delta1, and a Delta2 compensation is subtracted from CSI3-2 to obtain the CSI CSI3-1 of the third antenna at the first moment; a subtraction operation is performed on CSI3-3 and CSI3-2 to obtain a second deviation value Delta2, and Delta1 and Delta2 compensations are subtracted from CSI4-3 to obtain the CSI CSI4-1 of the fourth antenna at the first moment. Calibrated CSI3-1 and calibrated CSI4-1 are used with CSI1-1 and CSI2-1 to estimate the angle of the second device. For example, an algorithm such as MUSIC may be used to estimate the angle of the second device relative to the first device. In this scenario, the distance between the second antenna and the third antenna, the distance between the first antenna and the fourth antenna, and the distance between the second antenna and the fourth antenna are all less than the second threshold. Therefore, the angle of arrival AoA can be better calculated.

By using the foregoing method, in a case that an angle of arrival AoA of a peer device needs to be measured, an angle-of-arrival measurement effect can also be taken into account while basic transmission performance between devices is ensured. This greatly expands application scenarios of the first device and improves performance of the first device.

It should be noted that a quantity of antennas is not limited in this application. Four, five, six, or even more antennas all fall within the protection scope of this application as long as the antennas meet the requirement of the first threshold and the requirement of the second threshold.

Based on the same inventive concept, an embodiment of this application further provides a communication device, applied to a first device. FIG. 3 is a schematic diagram of a communication device according to an embodiment of this application. As shown in FIG. 3, the communication device includes an antenna assembly 32 and a switch assembly 34. The antenna assembly 32 is configured to communicate with a second device. The antenna assembly includes a first antenna 322, a second antenna 324, and a third antenna 326. The switch assembly 34 is configured to control the antenna assembly 32 to receive, at a first moment, first data from the second device through the first antenna 322 and second data from the second device through the second antenna 324. A distance between the first antenna 322 and the second antenna 324 is a first distance, a distance between the first antenna 322 and the third antenna 326 is a second distance, the first distance and the second distance are greater than a first threshold, a distance between the second antenna 324 and the third antenna 326 is a third distance, the third distance is less than a second threshold, and the first threshold is greater than or equal to the second threshold.

The first device may be a wireless access point (Access Point, AP) or another data communication device. The second device may be a user terminal or another data communication device.

By using the foregoing method, when performing communication, the first device does not use all antennas to perform data transmission simultaneously, but selects a group of antennas in which every two antennas, such as the first antenna and the second antenna, have a distance greater than the first threshold for communication. Generally, to meet a requirement on spatial correlation between antennas, that is, a distance should be as long as possible, the distance between antennas in the group of antennas is usually set to be greater than a half wavelength. The first threshold may be further set to a half wavelength. Using the combination of antennas with low correlation to perform communication can ensure a good communication performance.

It should be noted that data communication is not limited to communication using merely the two antennas of the first antenna and the second antenna. More antennas may be used to perform communication with the second device at a same moment, as long as every two antennas meet a requirement of the first threshold.

In addition, the first device is further provided with the third antenna. The distance between the third antenna and the second antenna is less than the second threshold. Therefore, it can be ensured that when AoA measurement is performed subsequently, an angle of arrival AoA can be better calculated. Generally, to meet a requirement for measuring an array antenna, the distance between the third antenna and the second antenna is usually set to be less than a half wavelength. The second threshold may be further set to a half wavelength. Further, the first threshold is greater than or equal to the second threshold.

Likewise, the AoA measurement is not limited to measurement merely using the two antennas of the second antenna and the third antenna. More antennas may be used to perform the measurement, as long as every two antennas meet a requirement of the second threshold.

In addition, it should be noted that the distance between every two antennas does not need to be completely the same as one another, as long as the requirement of the first threshold and the requirement of the second threshold can be met. The first threshold and the second threshold may be the same or different. The setting of the first threshold and the second threshold is not limited only to a half wavelength. The first threshold and the second threshold may also be adjusted to other lengths based a service requirement, for example, may be set to ¼ wavelength or ¾ wavelength.

In addition, because the distance between the first antenna and the third antenna is greater than the first threshold, the first antenna and the third antenna may also be used as a combination for communication transmission.

In another possible implementation, the switch assembly 34 is further configured to control the antenna assembly 32 to receive, at a second moment, third data from the second device through the first antenna 322 and fourth data from the second device through the third antenna 324; and the device further includes a central processing unit (Central Processing Unit, CPU) 38, where the CPU 38 is configured to obtain first channel state information CSI of the first antenna at the first moment based on the first data, obtain second CSI of the second antenna at the first moment based on the second data, obtain third CSI of the first antenna at the second moment based on the third data, and obtain fourth CSI of the third antenna at the second moment based on the fourth data; and obtain angle-of-incidence information of the second device relative to the first device based on the first CSI, the second CSI, the third CSI, and the fourth CSI.

In still another possible implementation, the CPU 38 is further configured to: obtain a first deviation between the first CSI and the third CSI, and calibrate the fourth CSI based on the first deviation to obtain a first calibration value of the fourth CSI at the first moment; and obtain the angle-of-incidence information of the second device relative to the first device based on the second CSI and the first calibration value.

To avoid impact on each piece of CSI from reference values at different moments, it is necessary to calibrate the CSI at the second moment and calibrate the related CSI to the first moment. Specifically, the following is assumed: The CSI of the first antenna at the first moment is CSI1-1, the CSI of the second antenna at the first moment is CSI2-1, the CSI of the first antenna at the second moment is CSI1-2, and the CSI of the third antenna at the second moment is CSI3-2. A subtraction operation is performed on CSI1-2 and CSI1-1 to obtain a first deviation value Delta1. A Delta1 compensation is subtracted from CSI3-2 to obtain CSI CSI3-1 of the third antenna at the first moment. Calibrated CSI3-1 is used with CSI2-1 to estimate the angle of the second device. For example, an algorithm such as MUSIC can be used to estimate the angle of the second device relative to the first device. In this scenario, the distance between the second antenna and the third antenna is less than the second threshold. Therefore, the angle of arrival AoA can be better calculated.

In a case that the first device is a wireless local area network (Wireless Local Area Network, WLAN) AP, the first device may further include a radio frequency assembly 36 and a Wi-Fi chip 310. The CPU 38 is responsible for controlling the Wi-Fi chip 310 and calculating AoA. The Wi-Fi chip 310 is responsible for implementing WLAN related protocols and communicating with the second device, and may be further configured to extract CSI data and perform antenna switching in an embodiment of this application. The radio frequency assembly 36 is responsible for performing amplification, filtering, and the like on a radio frequency WLAN signal. The switch assembly 34 is configured to select different antennas by using a gating function of a switch for a single radio frequency WLAN signal, where gating of the switch is controlled by the WLAN chip. The antenna assembly 32 is configured to radiate the radio frequency WLAN signal to space, or receive an incident electromagnetic wave in space and then transfer the electromagnetic wave to the WLAN chip by cascades.

In another possible implementation, the switch assembly 34 includes a first switch 342 and a second switch 344, and the radio frequency assembly 36 includes a first radio frequency subassembly 362 and a second radio frequency subassembly 364; the first switch 342 and the first radio frequency subassembly 362 cooperate to control the first antenna 322 and a fourth antenna 328; and the second switch 344 and the second radio frequency subassembly 364 cooperate to control the second antenna 324 and the third antenna 326. The switch assembly 34 in this application may be implemented by a mechanical switch, an electronic switch, or a combination thereof, as long as the gating function required in this application can be implemented. For example, the first switch 342 and the second switch 344 may be single-pole double-throw switches, or may be metal-oxide-semiconductor field-effect transistor (Metal-Oxide-Semiconductor Field-Effect Transistor, MOSFET, MOS for short) switch circuits.

It should be noted that functions of the foregoing assemblies may be implemented by software in cooperation with physical hardware. For example, a switch function may be implemented by a software program in cooperation with a physical switch. Likewise, functions of some assemblies may also be implemented by other assemblies. For example, the switch function may be implemented by the CPU.

FIG. 4 is a schematic diagram of another communication device according to an embodiment of this application. As shown in FIG. 4, in still another embodiment, the antenna assembly 32 further includes a fourth antenna 328; the switch assembly 34 is further configured to control the antenna assembly 32 to receive, at a third moment, fifth data from the second device through the third antenna 326 and sixth data from the second device through the fourth antenna 328; and the CPU 38 is further configured to obtain fifth CSI of the third antenna 326 at the third moment based on the fifth data, and obtain sixth CSI of the fourth antenna 328 at the third moment based on the sixth data; and obtain the angle-of-incidence information of the second device relative to the first device based on the first CSI, the second CSI, the third CSI, the fourth CSI, the fifth CSI, and the sixth CSI, where a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

Further, a 4-antenna structure is a relatively reliable basic condition for the AoA measurement, and the fourth antenna may also be disposed in the first device. In a 4-antenna scenario, because the distance between the first antenna and the second antenna and the distance between the third antenna and the fourth antenna are both greater than the first threshold, the antennas may also be used as two combinations for communication transmission. When AoA measurement needs to be performed on the second device, the first device sequentially uses three antenna combinations to perform communication with the second device to obtain six pieces of CSI, thereby implementing the angle-of-arrival AoA measurement more accurately.

In still another possible implementation, the CPU 38 is further configured to: obtain a first deviation between the first CSI and the third CSI, and calibrate the fourth CSI based on the first deviation to obtain a first calibration value of the fourth CSI at the first moment; obtain a second deviation between the fourth CSI and the fifth CSI, and calibrate the sixth CSI based on the first deviation and the second deviation to obtain a second calibration value of the sixth CSI at the first moment; and obtain the angle-of-incidence information of the second device relative to the first device based on the first CSI, the second CSI, the first calibration value, and the second calibration value.

In the 4-antenna scenario, the CSI also needs to be calibrated. The CSI at the second moment and the CSI at the third moment are calibrated to the first moment. Therefore, AoA calibration can be implemented more accurately. Specifically, the following is assumed: The CSI of the first antenna at the first moment is CSI1-1, the CSI of the second antenna at the first moment is CSI2-1, the CSI of the first antenna at the second moment is CSI1-2, the CSI of the third antenna at the second moment is CSI3-2, the CSI of the third antenna at the third moment is CSI3-3, and the CSI of the fourth antenna at the third moment is CSI4-3. A subtraction operation is performed on CSI1-2 and CSI1-1 to obtain a first deviation value Delta1, and a Delta2 compensation is subtracted from CSI3-2 to obtain the CSI CSI3-1 of the third antenna at the first moment; a subtraction operation is performed on CSI3-3 and CSI3-2 to obtain a second deviation value Delta2, and Delta1 and Delta2 compensations are subtracted from CSI4-3 to obtain the CSI CSI4-1 of the fourth antenna at the first moment. Calibrated CSI3-1 and calibrated CSI4-1 are used with CSI1-1 and CSI2-1 to estimate the angle of the second device. For example, an algorithm such as MUSIC can be used to estimate the angle of the second device relative to the first device. In this scenario, the distance between the second antenna and the third antenna, the distance between the first antenna and the fourth antenna, and the distance between the second antenna and the fourth antenna are all less than the second threshold. Therefore, the angle of arrival AoA can be better calculated.

Figure 5:
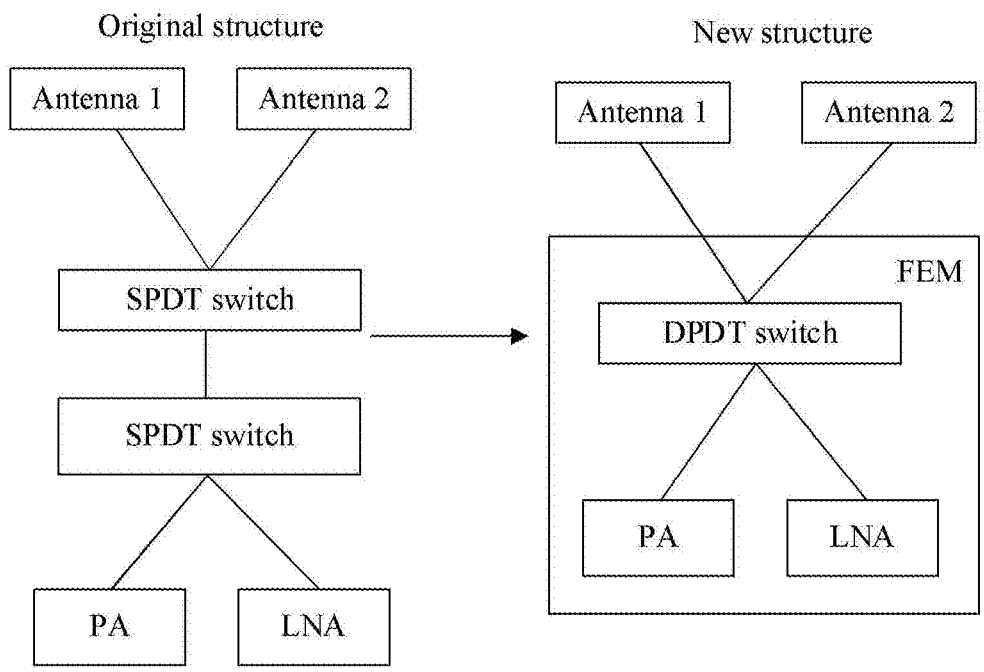
FIG. 5 is a schematic diagram of organizational architecture changes before and after integration design according to an embodiment of this application.

In still another possible implementation, the switch assembly 34 and the radio frequency assembly 36 are integrated in design to form a front-end module (Front-end Module, FEM) with a dual-antenna interface. FIG. 5 is a schematic diagram of organizational architectures showing changes before and after integration design according to an embodiment of this application. As shown in FIG. 5, before the integration design, there are two single-pole double-throw (Single Pole Double Throw, SPDT) switches, where the first switch is connected to a power amplifier (Power Amplifier, PA) and a low noise amplifier (Low Noise Amplifier, LNA) in the radio frequency assembly, the second switch is connected to two antennas, and there is signal attenuation at each switch. After the integration design, the two SPDT switches are merged into one double-pole double-throw (Double Pole Double Throw, DPDT) switch, as the only one switch which generates signal attenuation. Therefore, attenuation of a radio frequency signal can be reduced through switch merging, while production costs of the first device are reduced through the integration design.

It should be noted that a quantity of antennas connected to the switch assembly is not limited, and may be 2, or more, where a structure of the switch assembly is adaptively adjusted.

In still another possible implementation, the antenna assembly 32, the switch assembly 34, and the radio frequency assembly 36 are integrated on a PCB board. Therefore, production costs of the first device can be better reduced. In this case, although radiation efficiency of an antenna borne on the PCB board is lower than that of an external antenna, from a perspective of an actual application, a communication optimization effect and an AoA measurement capability of the antenna borne on the PCB board can be both maintained. Therefore, the design can have stronger functions nearly without increasing costs, so that the AoA measurement function can be implemented on almost all first devices, such as an AP.

Figure 6:
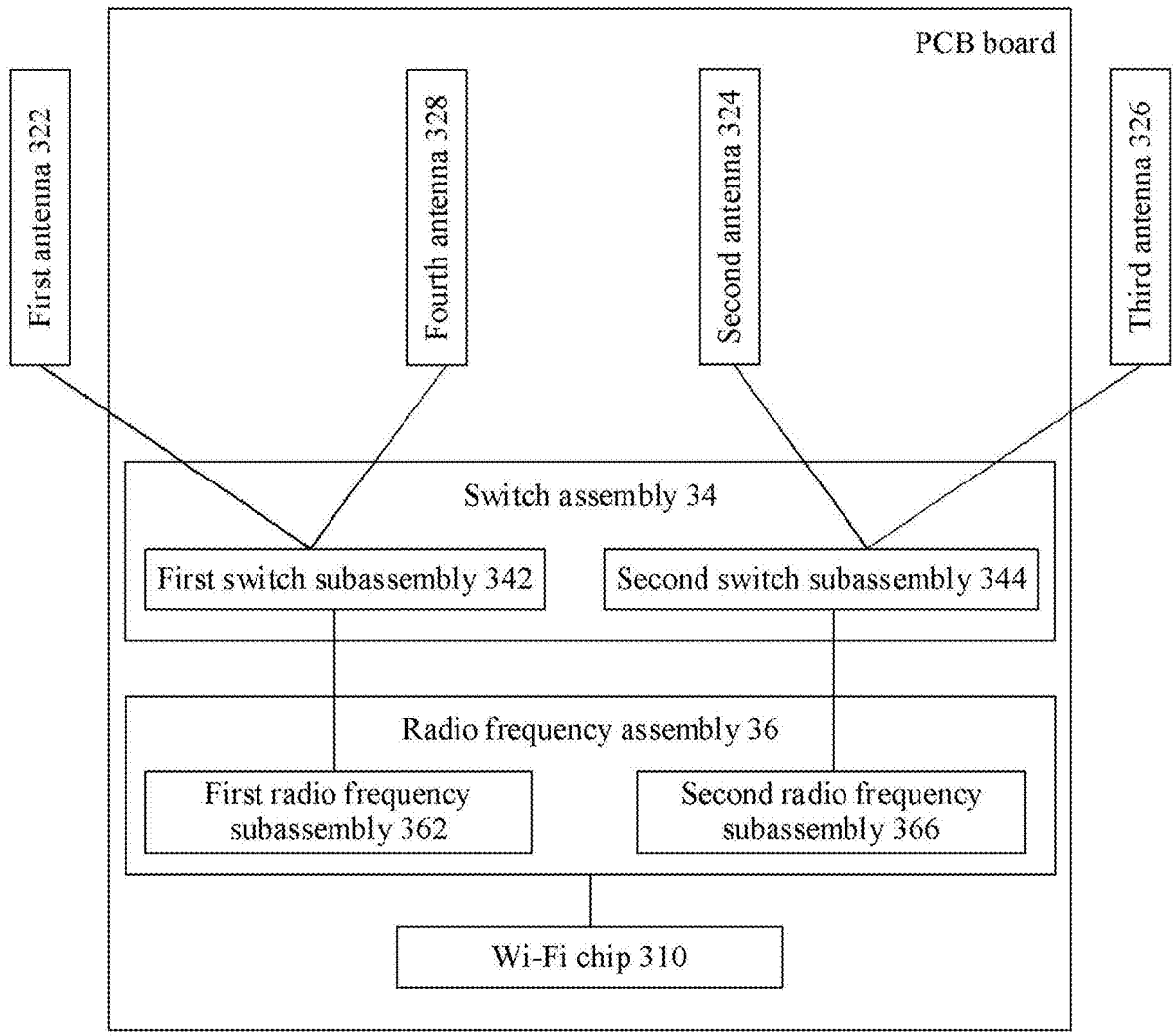
FIG. 6 is a schematic diagram of a still another communication device according to an embodiment of this application.

In still another possible implementation, at least one antenna in the antenna assembly 36 is disposed outside the PCB board. In an embodiment of this application, a quantity of external antennas is not limited. FIG. 6 is a schematic diagram of a still another communication device according to an embodiment of this application. As shown in FIG. 6, two high-performance external antennas, for example, the first antenna 322 and the third antenna 326, may be reserved in design, and the second antenna 324 and the fourth antenna 328 are borne on the PCB board. Distance parameters between all antennas still meet the foregoing design requirements, and this mode is a smart antenna mode. The first device reserves, in the manner of disposing the external antenna, the smart antenna mode supporting antenna switching, and therefore can select an antenna most suitable for a terminal to perform communication. Compared with a fixed antenna, the smart antenna can further improve transmission performance.

In the embodiments of this application, division into modules is an example, is merely division into logical functions, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 7:
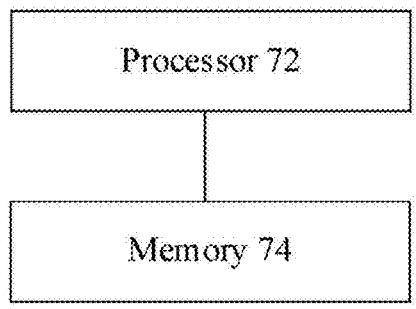
FIG. 7 is a schematic diagram of an electronic device according to an embodiment of this application.

Based on the same inventive concept, an embodiment of this application provides an electronic device. As shown in FIG. 7, the electronic device includes at least one processor 72, and a memory 74 connected to the at least one processor. A specific connection medium between the processor 72 and the memory 74 is not limited in an embodiment of this application. In FIG. 7, it is assumed that the processor 72 and the memory 74 are connected by a bus. The bus is represented by a bold line in FIG. 7. A connection manner between other components is only an example and is not limited. The bus may be classified into an address bus, a data bus, a control bus, and the like. For ease of representation, only one bold line is used to represent the bus in FIG. 7, but this does not mean that there is only one bus or only one type of bus.

In an embodiment of this application, the memory 74 stores instructions that can be executed by the at least one processor 72, and the at least one processor 72 may perform, by executing the instructions stored in the memory 74, the steps included in the foregoing communication method.

The processor 72 is a control center of the electronic device, may use various interfaces and lines to connect various parts of the entire electronic device, and execute various functions and data processing of the electronic device by running or executing the instructions stored in the memory 74 and invoking data stored in the memory 74, so as to perform overall monitoring on the electronic device.

Optionally, the processor 72 may include one or more processing units. An application processor and a modem processor may be integrated into the processor 72. The application processor mainly processes an operating system, a user interface, an application program, and the like. The modem processor mainly processes wireless communication. It may be understood that the modem processor may alternatively not be integrated in the processor 72. In some embodiments, the processor 72 and the memory 74 may be implemented on a same chip. In some embodiments, the processor 72 and the memory 74 may also be implemented separately on separate chips.

The processor 72 may be a general-purpose processor, for example, a central processing unit (CPU), a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. Steps of the methods disclosed with reference to the embodiments of this application may be directly performed and completed by using a hardware processor, or may be performed and completed by using a combination of hardware in the processor and a software module.

As a non-volatile computer-readable storage medium, the memory 74 may be configured to store non-volatile software programs, non-volatile computer-executable programs, and modules. The memory 74 may include at least one type of storage medium, for example, may include a flash memory, a hard disk, a multimedia card, a memory card, a random access memory (Random Access Memory, RAM), a static random access memory (Static Random Access Memory, SRAM), a programmable read-only memory (Programmable Read Only Memory, PROM), a read-only memory (Read Only Memory, ROM), an electrically erasable programmable read-only memory (Electrically Erasable Programmable Read-Only Memory, EEPROM), a magnetic memory, a magnetic disk, an optical disc, or the like. The memory 74 is but not limited to any other medium that can be used to carry or store desired program code in a form of an instruction or a data structure and can be accessed by a computer. The memory 74 in the embodiments of this application may alternatively be a circuit or any other apparatus that can implement a storage function, and is configured to store a program instruction and/or data.

Through programming of the processor 72, code corresponding to the communication method described in the foregoing embodiment can be built into a chip, so that the chip can perform the steps of the foregoing communication method during running. How to perform programming on the processor 72 is a technology known to a person skilled in the art, and details are not described herein.

Based on the same inventive concept, an embodiment of this application further provides a storage medium. The storage medium stores computer instructions. When the computer instructions are run on a computer, the computer is enabled to perform the steps of the foregoing communication method.

In some possible implementations, various aspects of the communication method provided by this application may be further implemented in a form of a program product, which includes program code. When the program product runs on a communication device, the program code is used to enable the communication device to perform the steps of the foregoing communication method according to various exemplary embodiments of this application described in the specification.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a magnetic disk memory, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various changes and variations to this application without departing from the spirit and scope of this application. Therefore, this application is also intended to cover the changes and variations provided that the changes and variations of this application fall within the scope of the claims of this application or equivalent technologies thereof.

What is claimed is:

1. A communication method, applied to a first device, wherein the first device comprises a first antenna, a second antenna, and a third antenna, and the method comprises:
   receiving, at a first moment, first data from a second device through the first antenna, and second data from the second device through the second antenna, wherein a distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold;
   receiving, at a second moment, third data from the second device through the first antenna, and fourth data from the second device through the third antenna;
   obtaining first channel state information CSI based on the first data, obtaining second CSI based on the second data, obtaining third CSI based on the third data, and obtaining fourth CSI based on the fourth data; and
   obtaining angle-of-incidence information of the second device relative to the first device based on the first CSI, the second CSI, the third CSI, and the fourth CSI.

2. The method according to claim 1, wherein the obtaining the angle-of-incidence information of the second device relative to the first device based on the first CSI, the second CSI, the third CSI, and the fourth CSI comprises:
   obtaining a first deviation between the first CSI and the third CSI, and calibrating the fourth CSI based on the first deviation to obtain a first calibration value of the fourth CSI; and
   obtaining the angle-of-incidence information of the second device relative to the first device based on the second CSI and the first calibration value.

3. The method according to claim 1, wherein the first device is further provided with a fourth antenna, and the method further comprises:
   receiving, at a third moment, fifth data from the second device through the third antenna and sixth data from the second device through the fourth antenna; and
   obtaining fifth CSI based on the fifth data, and obtaining sixth CSI based on the sixth data,
   wherein a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

4. The method according to claim 3, wherein the obtaining the angle-of-incidence information of the second device relative to the first device based on the first CSI, the second CSI, the third CSI, and the fourth CSI comprises:
   obtaining a first deviation between the first CSI and the third CSI, and calibrating the fourth CSI based on the first deviation to obtain a first calibration value of the fourth CSI;
   obtaining a second deviation between the fourth CSI and the fifth CSI, and calibrating the sixth CSI based on the first deviation and the second deviation to obtain a second calibration value of the sixth CSI; and
   obtaining the angle-of-incidence information of the second device relative to the first device based on the first CSI, the second CSI, the first calibration value, and the second calibration value.

5. The method according to claim 1, wherein the first threshold is a half wavelength of an incident electromagnetic wave;

or the second threshold is a half wavelength of an incident electromagnetic wave.

6. A non-volatile computer-readable storage medium, wherein the storage medium stores a computer program, and the computer program is configured to perform the method according to claim 1.

7. A communication device, comprising an antenna assembly and a switch assembly, wherein the antenna assembly is configured to communicate with a second device, and the antenna assembly comprises a first antenna, a second antenna, and a third antenna; and the switch assembly is configured to control the antenna assembly to receive, at a first moment, first data from the second device through the first antenna and second data from the second device through the second antenna, wherein a distance between the first antenna and the second antenna is a first distance, a distance between the first antenna and the third antenna is a second distance, the first distance and the second distance are greater than a first threshold, a distance between the second antenna and the third antenna is a third distance, the third distance is less than a second threshold, and the first threshold is greater than or equal to the second threshold; and the switch assembly is further configured to control the antenna assembly to receive, at a second moment, third data from the second device through the first antenna and fourth data from the second device through the third antenna; and the communication device further comprises a CPU, wherein the CPU is configured to obtain first channel state information CSI based on the first data, obtain second CSI based on the second data, obtain third CSI based on the third data, and obtain fourth CSI based on the fourth data; and obtain angle-of-incidence information of the second device relative to the communication device based on the first CSI, the second CSI, the third CSI, and the fourth CSI.

8. The communication device to claim 7, wherein the CPU is further configured to:

obtain a first deviation between the first CSI and the third CSI, and calibrate the fourth CSI based on the first deviation to obtain a first calibration value of the fourth CSI; and obtain the angle-of-incidence information of the second device relative to the communication device based on the second CSI and the first calibration value.

9. The communication device according to claim 7, wherein the antenna assembly further comprises a fourth antenna;

the switch assembly is further configured to control the antenna assembly to receive, at a third moment, fifth data from the second device through the third antenna and sixth data from the second device through the fourth antenna; and the CPU is further configured to obtain fifth CSI based on the fifth data, and obtain sixth CSI based on the sixth data; and obtain the angle-of-incidence information of the second device relative to the communication device based on the first CSI, the second CSI, the third CSI, the fourth CSI, the fifth CSI, and the sixth CSI, wherein a distance between the third antenna and the fourth antenna is a fourth distance, the fourth distance is greater than the first threshold, a distance between the first antenna and the fourth antenna is a fifth distance, a distance between the second antenna and the fourth antenna is a sixth distance, and the fifth distance and the sixth distance are less than the second threshold.

10. The communication device according to claim 9, wherein the CPU is further configured to:

obtain a first deviation between the first CSI and the third CSI, and calibrate the fourth CSI based on the first deviation to obtain a first calibration value of the fourth CSI;

obtain a second deviation between the fourth CSI and the fifth CSI, and calibrate the sixth CSI based on the first deviation and the second deviation to obtain a second calibration value of the sixth CSI; and obtain the angle-of-incidence information of the second device relative to the communication device based on the first CSI, the second CSI, the first calibration value, and the second calibration value.

11. The communication device according to claim 10, further comprising a radio frequency assembly, wherein the switch assembly comprises one or more switches, one end of the switch is connected to a plurality of antennas, and the other end of the switch is connected to the radio frequency assembly.

12. The communication device according to claim 11, wherein the antenna assembly, the switch assembly, and the radio frequency assembly are integrated on a printed circuit board (PCB).

13. The communication device according to claim 12, wherein at least one antenna in the antenna assembly is disposed outside the PCB.

14. The communication device according to claim 11, wherein the switch assembly comprises a first switch and a second switch, and the radio frequency assembly comprises a first radio frequency subassembly and a second radio frequency subassembly;

the first switch and the first radio frequency subassembly cooperate to control the first antenna and the fourth antenna; and the second switch and the second radio frequency subassembly cooperate to control the second antenna and the third antenna.

15. The communication device according to claim 14, wherein both the first switch and the second switch are double-pole double-throw switches.

16. The communication device according to claim 7, wherein the first threshold is a half wavelength of an incident electromagnetic wave;

or the second threshold is a half wavelength of an incident electromagnetic wave.

17. The communication device according to claim 7, wherein the antennas in the antenna assembly are arranged in a planar array or a three-dimensional array.

* * * * *